United States Patent [19]

Davidson et al.

[11] Patent Number: 4,799,159

[45] Date of Patent: Jan. 17, 1989

[54] DIGITAL AUTOMATIC FLIGHT CONTROL SYSTEM WITH DISPARATE FUNCTION MONITORING

[75] Inventors: Dale D. Davidson; Douglas G. Endrud, both of Glendale, Ariz.

[73] Assignee: Honeywell Inc., Minneapolis, Minn.

[21] Appl. No.: 739,583

[22] Filed: May 30, 1985

[51] Int. Cl.⁴ .................. G06F 11/08; G06F 15/50
[52] U.S. Cl. ................... 364/424.06; 371/68; 364/184; 364/551.01
[58] Field of Search ............ 364/550, 551, 434, 131, 364/138, 186, 184; 371/9, 36, 68

[56] References Cited

U.S. PATENT DOCUMENTS

| | | | |
|---|---|---|---|
| 4,032,757 | 6/1977 | Eccles | 371/9 |
| 4,115,847 | 9/1978 | Osder et al. | 364/186 |
| 4,130,241 | 12/1978 | Meredith et al. | 371/68 |
| 4,356,546 | 10/1982 | Whiteside et al. | 371/36 |
| 4,622,667 | 11/1986 | Yount | 371/9 |
| 4,644,538 | 2/1987 | Cooper et al. | 371/9 |

Primary Examiner—Parshotam S. Lall
Assistant Examiner—Thomas G. Black
Attorney, Agent, or Firm—Seymour Levine; Albin Medved

[57] ABSTRACT

A channel of an automatic flight control system utilizes dual identical digital processors. Active task modules and monitor modules therefor are included in the processors. The active task modules and the monitor modules are arranged so that an active task module in one processor has a corresponding monitor module in the other processor where the corresponding modules perform disparate functionality over disjoint computation paths with respect to each other. The monitor module tests to determine if the aircraft is performing in a manner prohibited by the functionality controlled by the associated task module.

5 Claims, 3 Drawing Sheets

DIGITAL AUTOMATIC FLIGHT CONTROL SYSTEM WITH DISPARATE FUNCTION MONITORING

BACKGROUND OF THE INVENTION

1. Field of the Invention

The invention relates to automatic flight control systems utilizing digital flight control computers, particularly with respect to reducing safety hazards resulting from generic design errors in the software or the processors.

2. Description of the Prior Art

Automatic flight control systems are constrained by Federal Air Regulations to provide safe control of the aircraft throughout the regimes in which the automatic flight control system is utilized. Any failure condition which prevents continued safe flight and landing must be extremely improbable. Present day regulations require a probability of less than $10^{-9}$ failures per hour for flight critical components. A flight critical portion of an automatic flight control system is such that the failure thereof will endanger the lives of the persons aboard the aircraft. For example, components of an automatic flight control system utilized in automatically landing the aircraft may be designated as flight critical, whereas, certain components utilized during cruise control may be designated as non-critical. Generally, the safety level of components of the system is determined by analysis and testing procedures familiar to those skilled in the art. Such procedures are often referred to as verification and validation.

Automatic flight control systems utilizing analog computers and components had been prevalent in the art wherein it had been completely practical to perform the verification and validation procedures to certify conformance of such systems to the safety requirements of the Federal Air Regulations. Traditionally, such analog systems inplemented independent control of the aircraft axes by utilizing, for example, independent pitch and roll control channels. Certification analysis was facilitated by the axis independent control.

A known technique for enhancing automatic flight control system reliability is that of dual redundancy. Dual redundancy is the utilization of two identical channels with cross channel monitoring to detect a failure in one of the channels. Although such systems are effective against random faults which affect only one channel, cross channel monitoring does not provide effective detection of generic faults. A generic fault is defined as a fault that is inadvertently designed into a component such that all components generically have this fault and respond in a defective manner. When identical components having a generic fault are in respective redundant channels, the cross channel monitoring detects the same although erroneous output from both channels and therefore does not detect the error. Such generic faults are also denoted as design errors.

In present day technology, stored program digital computers are supplanting the analog computer of the prior art technology. It has generally been found that a digital computer including the hardware and software is of such complexity that the verification and validation analysis for certification in accordance with Federal Air Regulations is exceedingly more time consuming, expensive and difficult than with the analog computer. The level of complexity and sophistication of the digital technology is increasing to the point where analysis and proof of certification to the stringent safety requirements is approaching impossibility. To further exacerbate the difficulty, current day digital flight control computers perform all of the computations for all of the control axes of the aircraft in the same computer unlike in the analog computer approach where the control of the aircraft axes was provided by separate respective channels.

A further problem engendered by the introduction of the programmed digital computer technology into automatic flight control systems is that the extensive software required is susceptible to generic design errors. An error can arise in the definition phase of software preparation as well as in the coding thereof. A generic design error can occur in the attendant assembler or compiler as well as in the micro-code for the processor. For example, an error in a microcircuit chip mask for the micro-code, as well as for the processor or associated components can propagate into all of the systems constructed using the mask. In the prior art, in order to satisfy the stringent safety requirements of the Federal Air Regulations, exhaustive verification and validation was often utilized to prove the absence of such generic design faults in the software as well as in the processor hardware to the required level. It is appreciated that such verification and validation procedures are exceedingly time consuming and expensive.

For the reasons given above, it is appreciated that redundant identical channels of digital data processing with cross channel monitoring may not detect hardware and software generic design errors so that reliability can be certified to the required level. Furthermore, with the increasingly complex and sophisticated digital processing being incorporated into automatic flight control systems, it is approaching impossibility to prove by analysis the absence of such generic errors to the levels required by the Federal Air Regulations. It is appreciated that in a digital flight control channel, including a Flight Control Computer, sensors, and Input/Output (I/O) apparatus, all of the processing for all aircraft axes are performed in the same computer and critical as well as non-critical functions are controlled by the same channel. Thus, the entire channel must be certified in accordance with the "extremely improbable" rule discussed above with respect to flight critical aspects of the system. Thus, even those portions of the system utilized for performing non-critical functions must be certified to the same level as the critical portions since the non-critical portions are within the same computation complex as the critical portions.

In order to overcome these problems, the automatic flight control technology has only recently advanced to the concept of dissimilar redundancy. In dissimilar redundancy, dissimilar processors perform identical tasks utilizing dissimilar software with cross channel monitoring to detect failures. With this approach, a generic error designed into the processor or software of one channel will not exist in the processor or software of the other channel and the cross channel monitoring will detect the discrepancy. In this prior art arrangement, the redundant computers are generally dissimilar in hardware and architecture, utilize dissimilar software, compilers or assemblers and often utilize different hardware and software design teams. In this prior art arrangement, each dissimilar computer requires its own full set of software for performing all of the flight control and flight director functions performed by the system, as well as requiring its own assembler or compiler and ancillary development apparatus and personnel. Such software and the like in modern sophisticated jet transports tend to be exceedingly extensive and consequently expensive. Multiple complete sets of dissimilar software for a system adds undesirably to the cost thereof. Additionally, in such systems, design changes to software or processor may result in a significant impact on the safety level of the system.

SUMMARY OF THE INVENTION

The above disadvantages of the prior art are obviated by an automatic flight control system responsive to sensors that provide sensor signals in accordance with flight conditions experienced by the aircraft, the aircraft having control means such as aerodynamic control surfaces, throttle controls and the like for controlling the flight conditions of the aircraft. Each channel of the automatic flight control system comprises a digital computer having a computer input responsive to the sensor signals, a program memory and a computer output. A program is stored in the program memory of the computer, the program comprising a plurality of first program segments that are executed by the computer for performing a plurality of tasks that generate command signals for controlling the aircraft flight conditions. The program further includes a plurality of second program segments associated with the first program segments, respectively, for monitoring the performance of the first program segments, respectively, each second program segment performing a mutually disparate task over mutually disjoint computation paths with respect to the associated first program segment. The automatic flight control system channel further comprises means for controlling repeated iterations of the program and means for assuring that each of the second program segments is executed by the computer during each iteration of the program.

Preferably, two similar computers are utilized in each channel where a first program segment is executed by one of the computers and the corresponding second program segment is executed by the other computer. In the preferred embodiment of the invention, the disparate task performed by a second program segment comprises a plurality of tests to determine if the aircraft is performing in a manner in which it would not be permitted to perform in accordance with the function controlled by the corresponding first program segment.

DESCRIPTION OF THE PREFERRED EMBODIMENT

Figure 1:
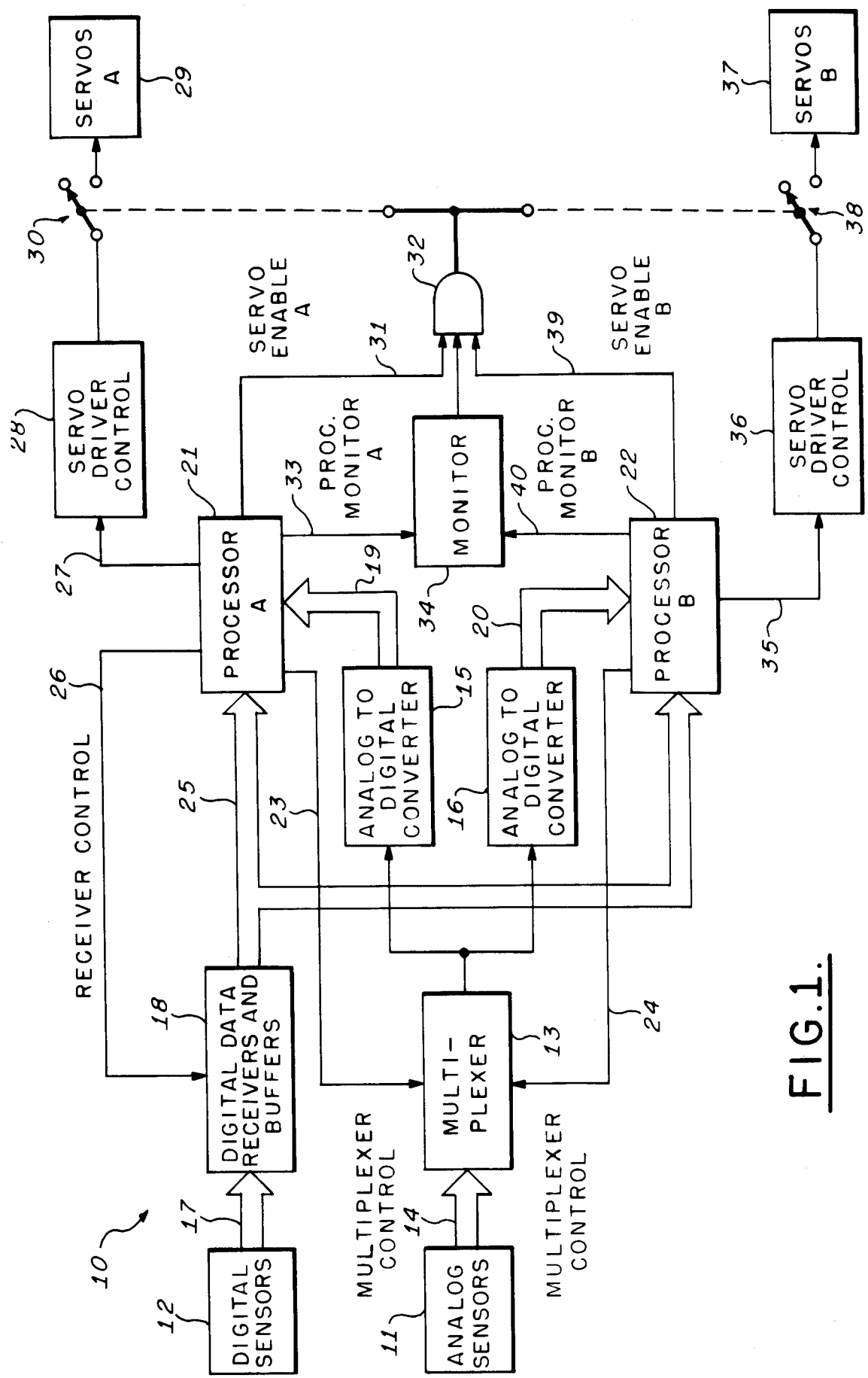
FIG. 1 is a schematic block diagram illustrating a channel of an automatic flight control system implemented in accordance with the present invention.

Referring to FIG. 1, a block schematic diagram of a single channel 10 of an automatic flight control system is illustrated. The complete system may include two such channels in a dual channel configuration. In a single channel arrangement, the automatic flight control system is fail passive and the dual channel arrangement provides fail operative performance.

The channel 10 includes a set of analog sensors 11 comprising the required complement of sensors that provide analog signals for use in controlling the aircraft. The set of analog sensors 11 includes conventional attitude, rate and acceleration sensors as well as other devices such as control wheel force sensors that are conventionally utilized in modern jet transports. The sensors 11 may include such devices as directional and vertical gyroscopes, rate gyroscopes and accelerometers. The sensor set 11 may additionally include conventional radio guidance equipment such as VOR, ILS and MLS systems as well as navigational systems for providing steering data. The sensor set 11 may also include inputs from the aircraft control surface position transducers as well as engine sensors and feedback signals from the aircraft servos and inputs from such devices as radio altimiters and the like.

The channel 10 also includes a complement of digital sensors 12. The digital sensors 12 may include conventional attitude and heading reference sensors as well as a conventional digital air data computer for providing such parameters as barometric altitude, total air temperature, air speed, dynamic pressure and the like. The digital sensors 12 may also include other equipment such as a digital DME receiver as well as discrete inputs from, for example, the panel push buttons.

The outputs of the analog sensors 11 are applied to a conventional multiplexer 13 via an electrical data path 14. The output of the multiplexer 13 is applied to conventional analog-to-digital converters 15 and 16. The outputs of the digital sensors 12 are applied via an electrical data path 17 to digital data receivers 18 which include buffers for entering the digital data1 into the system.

The analog signals from the analog sensors 11 are applied via the analog-to-digital converters 15 and 16 and respective electrical data paths 19 and 20 to the input ports of respective digital computers 21 and 22. The computers 21 and 22 are denoted as processor A and processor B respectively. The processors 21 and 22 provide multiplexer control signals on buses 23 and 24 respectively to the multiplexer 13 for controlling the multiplexer 13 to individually select analog sensor signals for inputting into the respective processors 21 and 22 in accordance with the processor requirements as controlled by the programs stored therein.

The digital input data from the digital sensors 12 are applied via the digital data receivers and buffers 18 and an electrical data path 25 to a further data input port of the processor 21. The digital data on the data path 25 is also applied to a further data input port of the processor 22. The processor 21 provides a receiver control signal on a bus 25 to the digital data receivers and buffers for selectively inputting the appropriate digital data from the sensors 12 into the processors 21 and 22 in accordance with the program flow control of the processor 21. The control signals on the bus 26 controls the receivers and buffers 18 so as to appropriately sequence the data from the digital sensors 12 to the processors 21 and 22.

The digital processors 21 and 22 are preferably identical and of conventional architecture, and are of the general purpose, medium scale design, a variety of which are commercially procurable in specifically constructed computers for airborne analysis and control for automatic flight control and flight director applications. Preferably, an FZ-800 digital flight control computer commercially procurable from the Avionics Division of the Aerospace and Marine Group of the Sperry Corporation may be utilized in implementing the system. The FZ-800 computer is based on the Zylog Z-8002 microprocessor. Further details with respect to the internal arrangement of the digital processors 21 and 22 and the programs stored therein will be discussed below with respect to ensuing figures.

The processor 21 provides an output via a data path 27 to a servo driver control system 28. The servo driver control system 28 provides outputs to servos 29 via a servo cut off relay switch 30. The servo driver control system 28 and the servos 29 may be of the conventional electrical torque motor and linkage type for control of the aircraft aileron, elevator, rudder and trim control surfaces as well as for providing control for the automatic throttle system. Alternatively, the servos and actuators may be of the conventional electro-mechanical or electro-hydraulic variety. The servo driver control 28 and servos 29 are schematically representative of the conventional complete three axis control apparatus for the aircraft control surfaces and automatic throttle system commonly utilized in modern air transports.

Primarily, the processor 21 directly controls the servos of the system and is part of the servo loop. In this configuration, the servos 29 provide feedback signals as inputs (not shown) in the analog sensor set 11 and the processor 21 drives the servos, so controlled, to null. Alternate servos utilized by the system may be of the self contained, closed loop configuration containing internal feedback loops. In both arrangements, the processor 21 provides a command signal to the servo driver control 28, which is configured to provide the appropriate drive format for the applicable servo configuration.

The processor 21 also provides a servo enable signal on a bus 31 via an AND gate 32 to activate the servo cutoff switch 30. The processor 21 provides a servo disabling signal on the bus 31 in accordance with monitoring functions, to be described, resident in the processor 21.

For reasons to be described, the processor 21 includes program segments which determine that certain blocks of software are repetitively executed. The processor 21 outputs A-processor monitor signal on a bus 33 in accordance with the continuous iterations of these software blocks. The processor monitor signal on the bus 33 is applied to a hardware monitor 34 that operates in conjunction with the processor monitor software resident in the processor 21. Such processor monitoring hardware and software may be implemented as disclosed in U.S. Pat. No. 4,115,847 issued Sept. 19, 1978 entitled "Automatic Flight Control System with Operatively Monitored Digital Computer". The output of the monitor 34 is applied as an input to the AND gate 32 for actuating the servo cutoff 30 in the event program blocks resident in the processor 21 fail to be executed repetitively. Although the preferred embodiment of the invention was described in terms of utilizing the processor monitor system described in said U.S. Pat. No. 4,115,847, other processor monitor systems may be utilized to the same effect to assure that program blocks resident in the processor 21 are repetitively executed.

In a manner similar to that described above with respect to the processor 21, the processor 22 provides outputs 35, 39 and 40 that provide the functions described above with respect to the outputs 27, 31 and 33, respectively, from the processor 21. Additionally, the processor 22 has servo driver control system 36, servos 37 and servo cutoff control 38 associated therewith in a manner similar to that described above with respect to the processor 21. It is appreciated that the servo cutoff switches 30 and 38 are enabled and disabled simultaneously via the AND gate 32 in accordance with the signals on the conductors 31 and 39 and the output of the monitor 34. A failure indication on any input to the AND gate 32 results in disabling the servos 29 and 37 by opening the servo cutoff switches 30 and 38. It is appreciated that the FZ-800 computer includes all of the components of FIG. 1 except the elements 11, 12, 14, 17, 29 and 37. The processors 21 and 22 store program blocks that operate upon the signals from the sensors 11 and 12 and provide output signals and commands via conductors 27 and 35 to actuate the servo driver control systems 28 and 36. The processors 21 and 22 store the active function control modules for effecting the operative tasks to be performed by the system. The processors 21 and 22 also include monitor modules for the tasks, respectively. If a task control module is resident in the processor 21, the corresponding monitor module is stored in the processor 22, and similarly if a task control module is resident in the processor 22, the corresponding monitor module is stored in the processor 21. Real-time clocks (not shown) within the computers 21 and 22 control repeated iterations of the stored programs so as to effectively provide continuous control of the aircraft. In accordance with the invention, the task function control module and the corresponding monitor module have disparate functionality and disjoint computation paths with respect to each other.

Figure 2:
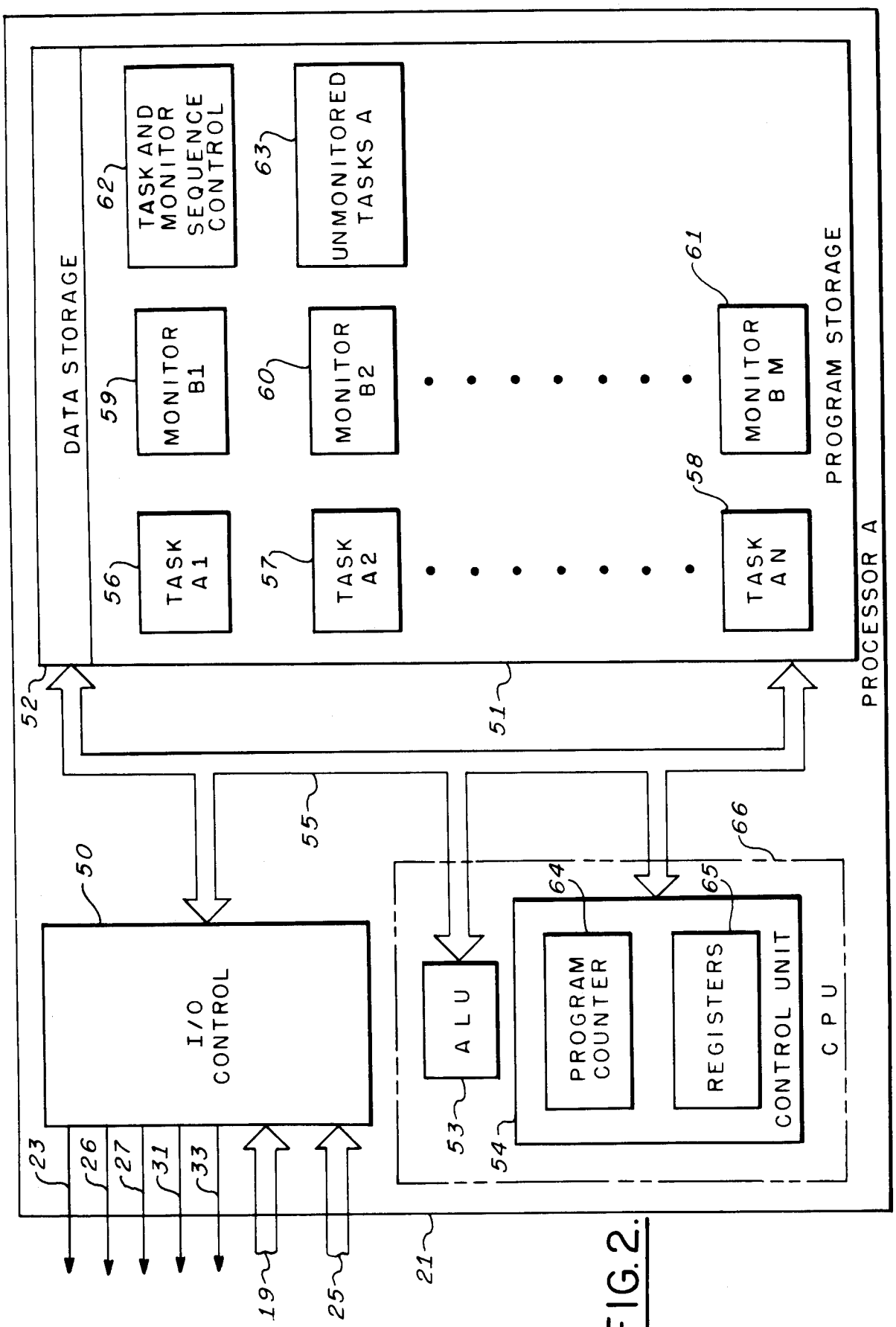
FIG. 2 is a schematic block diagram illustrating details of processor A of FIG. 1.

Referring now to FIG. 2, in which like reference numerals indicate like components with respect to FIG. 1, the processor 21 of FIG. 1 is illustrated depicting the basic internal construction thereof. The processor 21 includes an input/output (I/O) control unit 50 that provides the input portion for the digital signals on the data paths 19 and 25 of FIG. 1 and also provides output signals on the buses 23, 26, 27, 31 and 33 as discussed above with respect to FIG. 1. The digital computer 21 includes program storage 51, data storage 52, an arithmetic and logic unit (ALU) 53 and a control unit 54, all interconnected with respect to each other and with the I/O control unit 50 for two-way communication therebetween via a bus 55. It will be appreciated that the internal configuration of the computer 21 is of a conventional design and will therefore only briefly be described to facilitate an understanding of the invention.

The program memory 51 has stored therein the operative program for performing all of the functions required by the A-processor of the automatic flight control system 10 illustrated in FIG. 1. The program is generally arranged in segments or modules as schematically illustrated by the blocks 56 through 63. The operative program includes active function or task modules A1, A2, . . . , AN associated with reference numerals 56–58 and also includes monitor modules B1, B2, . . . , BM for reasons to be clarified. The monitor modules are denoted by the reference numerals 59–61. The operative program also includes a task and monitor sequence control block 62 by which the task and monitor modules are called and sequenced in accordance with the program flow desired for the operative functionality of the automatic flight control system 10 (FIG. 1) in which the processor 21 is utilized. The operative program stored in the program memory 51, also includes modules for performing unmonitored tasks as schemtically represented by the block 63. These tasks are of a type that do not affect flight safety or air worthiness whereby a malfunction of one of these tasks will not have undesirable results. Such unmonitored tasks may comprise mode logic, certain message management functions and certain gain programming functions that are not necessary for flight safety. Details of the structure and operation of the program stored in the program memory 51 will be described herein below.

The data memory or storage 52 is utilized for storing the constants used by the program as well as containing predetermined locations for the storage of the various types of data provided by the sensors 11 and 12 of FIG. 1.

The control unit 54 includes a program counter 64 and a plurality of registers 65 and the arithmetic and logic unit 53 includes the circuits necessary for performing the arithmetic and logical operations for the computer 21. In a manner well understood in the art, the control unit 54, as indexed by the program counter 64, sequentially fetches the instructions of the program from the program memory 51 and controls the computer 21 to perform the instructions, fetching data from the data memory 52 when required. The combination of the control unit 54 and the arithmetic and logic unit 53 is often referred to as the central processor unit (CPU) which is designated by the reference numeral 66. The arithmetic and logic unit 53 is utilized under control of the control unit 54 to perform the conventional arithmetic and logical operations as required by the program. The I/O control unit 50 accepts data from the inputs 19 and 25 and provides data to the outputs 27 and 33 as well as timing and control signals on the outputs 23, 26 and 31 under control of the control unit 54 as commanded by the program instructions stored in the program memory 51. If any of the monitor modules 59–61 detects a failure, the processor 21 provides a disabling signal on the conductor 31 to disable the servos 29 and 37 via the AND gate 32 and the servo cutoff switches 30 and 38 of FIG. 1.

Figure 3:
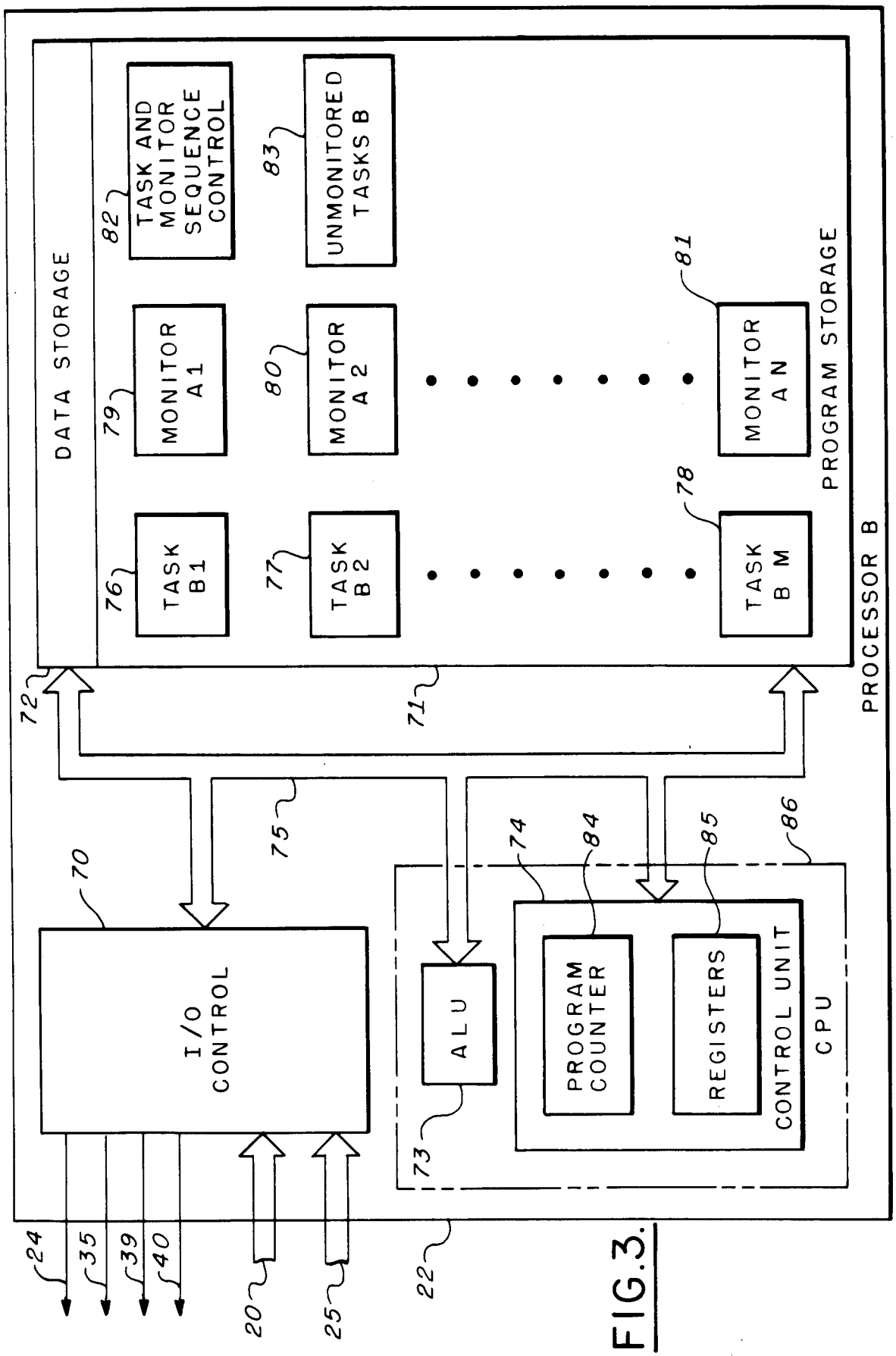
FIG. 3 is a schematic block diagram illustrating details of processor B of FIG. 1.

Referring now to FIG. 3, in which like reference numerals indicate like components with respect to FIG. 1, the B-processor 22 is illustrated depicting the basic internal construction thereof. The structure of the computer 22 is substantially identical to that of the computer 21 described above with respect to FIG. 2. The computer 22 of FIG. 3 includes components 70–86 corresponding functionally and structurally to the components 50–66, respectively, described above with respect to FIG. 2. It is noted that the I/O control unit 70 does not provide an output comparable to the output 26 of FIGS. 1 and 2 since it is the A-processor 21 and not the B-processor 22 that provides control of the digital data receivers and buffers 18 of FIG. 1.

The program memory 71 of the processor 22 contains the active task or function modules B1, B2, ..., BM denoted by the reference numerals 76–78. These program modules control the active automatic flight control system tasks to be performed by the B-processor 22. The program storage 71 also includes monitor module A1, A2, ..., AN denoted by the reference numerals 79–81. If one of the monitor modules 79–81 detects a failure, a disabling signal is provided on the conductor 39 via the I/O control unit 70 to disable the servos 29 and 37 via the AND gate 32 and the servo cutoff switches 30 and 38 of FIG. 1.

Referring now to FIGS. 2 and 3, the A-processor 21 of FIG. 2 contains the active task modules A1–AN and the B-processor 22 of FIG. 3 contains the respectively corresponding monitor modules A1–AN. Each of the monitor modules of the B-processor monitors the correspondingly designated task module of the A-processor. In a similar manner, the task modules BM of the B-processor are monitored by the monitor modules B1–BM, respectively, of the A-processor. In accordance with the invention, each task module in one of the processors and the corresponding monitor module in the other processor provide disparate functionality with respect to each other over disjoint computation paths. The functionality of each task module is determined by the required or desired performance of the module, whereas the corresponding monitor module functionality is determined by performance exhibited or events occuring that are prohibited by the task module; for example, the aircraft being controlled to perform beyond predetermined limits. Generally, in the Preferred Embodiment of the invention, the task modules in the A-processor 21 contain the automatic trim control functions as well as the flight guidance fucntions of the system and the monitor modules of the B-processor 22 provide the respective monitors therefor. The task modules in the B-processor 22 contain the active control functions for the aileron, elevator and rudder for control about the roll, pitch and yaw axes of the aircraft, each such module containing the amplitude, rate and acceleration limits applied in controlling the excursions of the aircraft throughout its flight envelope. The corresponding monitor modules for the three axes control functions are resident in the A-processor 21.

Although the Preferred Embodiment of the invention is described in terms of separate identical processors 21 and 22, it is appreciated that all of the tasks and monitors may be included within a single processor in practicing the invention. Assurance, however, should be provided that all of the monitor modules are performed. This assurance is provided by the processor monitor 34 and associated software within the processors 21 and 22 as described above with respect to FIG. 1. It is appreciated that in performing the processor monitoring function, the monitor block 34 of FIG. 1 is utilized in conjunction with various operations performed by software modules interspersed among the tasks and monitor blocks of FIGS. 2 and 3 in the manner illustrated in said U.S. Pat. No. 4,115,847. The processor monitoring structure and operation of said U.S. Pat. No. 4,115,847 is separately utilized in each of the processors to assure that the monitor modules contained therein are executed during each iteration of the program.

With respect to the active function control modules and the corresponding monitor modules, the following are included in the preferred embodiment of the invention. The task A1 module 56 of the processor 21 of FIG. 2 represents the automatic trim function of the system and the monitor A1 module 79 of the processor 22 provides the monitoring functions therefor. The automatic trim function performed by the A-processor 21 provides control signals to the appropriate servo driver control 28 (FIG. 1) to actuate the trim servos 29 (FIG. 1) so as to null the torque on the elevator control surface hinge pins to zero. The automatic trim function reduces the servo control forces on the elevator to zero by positioning the trim tab or trim stabilizer so as to effect the torque null with respect to the elevator. The corresponding monitor module 79 in the B-processor 22 tests for a trim run-away condition and for a trim inoperative condition. The trim run-away condition is a hazardous, prohibited trim system output resulting in opposed trim conditions where the elevator surface and the trim surface are running in opposite directions. The trim inoperative condition is also a hazardous, prohibited condition. The monitor A1 module 79 of the B-processor of FIG. 3 determines operability of the trim servo drive by utilizing a direct end-around output from the servo drive to the analog sensor inputs 11 of FIG. 1. This connection is not illustrated in FIG. 1.

Thus, it is appreciated that the active trim function module 56 and the corresponding monitor module 79 exhibit disparate functionality over disjoint computation paths. The active trim function is involved in positioning the trim surface whereas the monitoring module is concerned with detecting specific undesired operation and conditions.

The B1 task module 76 in the B-processor 22 of FIG. 3 provides the automatic flight control system active roll axis control function and the B1 monitor module 59 of the processor 21 of FIG. 2 provides the monitor therefor with disparate functionality and disjoint computation paths with respect to the B1 task block 76. The task block 76, utilizing the I/O control 70, inputs the data for performing the active roll axis control function; such data including roll angle, roll body rate and air data signals such as dynamic pressure for controlling the programming of gains with respect to the sensitivity of the aileron control surfaces. The roll control law utilized in the active roll axis control function includes limits on the roll angle and roll rate to maintain the aircraft within normal performance maneuver boundries. The B1 monitor module 59 in the A-processor 21, monitors for over limits in displacement and rate and for roll control that is in the wrong direction. The B1 monitor module 59 has access to the polarity and amplitude of the roll servo motor voltage as well as the aircraft roll angle and rate. The B1 monitor 59 assesses the roll displacement and rate with respect to the direction of roll servo drive to determine if the aircraft is exhibiting an out-of-limits condition. For example, if, due to an error the B-processor 22 issues servo drive signals to roll the aircraft beyond the roll angle limit, the A-processor 21 would discern this beyond limits condition and would then assess the roll rate to determine if the roll rate was in a direction to decrease the roll error. If the roll rate is not in the direction to return the aircraft to within roll angle limits, the B1 monitor module 59 would then assess the output of the roll servo motor to determine whether or not the servo was attempting to return the aircraft to within limits. If the roll servo is not endeavoring to return the aircraft to within limits, the A-processor 21 issues a disabling signal on the conductor 31 to actuate the servo cutoff switches 30 and 38 via the AND gate 32 of FIG. 1. Thus the B1 monitor 59 of the processor 21 determines if the aircraft is exhibiting behavior prohibited by the active control function of the B1 task module 76 of the processor 22. In this manner, the modules 59 and 76 control disparate functionality over disjoint computation paths.

The active control function for the pitch axis is also performed by the B-processor 22 of FIG. 3, for example, by the B2 task module 77. The corresponding monitor module is performed by the A-processor 21 of FIG. 2 by, for example, the B2 monitor module 60. The required input data acquired through the I/O control includes the pitch angle and pitch body rate from the attitude system. The input data also includes gain programming signals from the air data system such as true and calibrated air speed as well as dynamic pressure utilized to control the sensitivity of the system to the wind loading of the pitch control surfaces as a function of speed. The pitch control law includes limits on pitch angle and pitch body rate as well as an effective G-limit programmed as a function of true air speed with respect to pitch angle and pitch body rate.

The disparate monitoring function associated with pitch axis control is resident in the A-processor 21 as controlled, for example, by the B2 monitor module 60. The B2 monitor module 60 assesses closure of the pitch loop embodied in the B-processor 22. Closure is the process of bringing the control loop of the aircraft into alignment with the issued command. Closure is effected when there is a zero servo error signal condition. If the servo error signal is non-zero, then the pitch rate and servo drive are assessed with respect to polarity to determine if control is in process to effect closure. For example, the pitch command issued from the guidance control is compared to the actual aircraft pitch attitude to determine if there is an error in excess of a predetermined tolerance. If such error is detected, the polarity of the pitch rate is assessed to determine if it is in the appropriate direction to reduce the attitude error. If the polarity of the pitch rate is not appropriate, then the polarity of the servo drive is assessed to determine if the servo is endeavoring to drive the loop to closure. Failure of all of these tests is defined as a faulted condition and the servos 29 and 37 (FIG. 1) are disconnected via the servo cutoff switches 30 and 38.

The B2 monitor module 60 of the processor 21 also determines if the active pitch axis control function is causing normal acceleration in excess of the G-limit. The monitor inputs servo data and normal acceleration data via the I/O control unit and assesses the normal acceleration data for an over limit condition by cross correlating the actual normal acceleration with the servo feedback to determine if the servo output is the cause of the excessive normal acceleration. If the servo is causing the condition, the system is disconnected via the servo cutoffs 30 and 38 of FIG. 1.

The B-processor 22 of FIG. 3 also includes the active functionality of the yaw damper which provides servo drive control for the aircraft rudder. The yaw damper may, for example, be controlled by a task B3 module in the program memory 71 of the processor 22. The corresponding monitor function would then be perfomred by a monitor B3 module resident in the program memory 51 of the processor 21 of FIG. 2. The active task module in the B-processor 22 controls coordination of the turn maneuver and stabilization of the aircraft about the yaw axis in straight and level flight. The yaw damper also includes a function to limit the rudder servo position authority. The turn coordination, yaw damping stabilization and servo authority limiting are gain programmed as a function of airspeed and dynamic pressure. These functions are performed in the B-processor 22 in response to a yaw body rate signal, a lateral acceleration signal, a roll attitude signal and a pitch attitude signal from the attitude system as well as airspeed and dynamic pressure data from the air data system accessed by the B-processor 22 of FIG. 3 through the I/O control unit 70. In turn coordination, the yaw damper provides the amount of yaw body rate so as to null the lateral acceleration in order to maintain the composite force vector aligned with the vertical axis of the aircraft. In performing the yaw stabilization function, the yaw body rate is nulled so as to prevent oscillation of the aircraft about the yaw axis resulting from gust disturbances. This yaw damping function is gain programmed as a function of airspeed and dynamic pressure data to decrease the sensitivity of the system as airspeed increases because of the increased sensitivity of control surfaces, especially the rudder control surface, as a function of airspeed. The limiting function of the yaw damper bounds the servo position authority so as to limit the yaw acceleration of the aircraft to a predetermined maximum. Rudder displacements are limited as a function of dynamic pressure such that oscillatory or hardover outputs of the rudder are limited in amplitude so that the yaw acceleration maximum is not exceeded.

The yaw monitor in the A-processor 21 of FIG. 2 detects excessive side loading of the aircraft and excessive motion of the rudder servo actuator due to non-damped conditions where, for example, the yaw damper increases rather than relieves the side loading on the aircraft. Whenever the yaw damper provides an incorrect output, side slip of the aircraft occurs which is detected via the lateral acceleration signal. The lateral acceleration signal is assessed for excess Gs of side loading and is correlated with the rudder servo actuator feedback to determine if the actuator is causing the side slip condition. This assessment is performed on the basis of polarity in the manner described above with respect to the pitch and roll axes. Thus it is appreciated that the yaw damper active function and the corresponding monitor perform disparate functions over disjoint computation paths.

Programs for insertion into the program memories 51 and 71 of the respective processors 21 and 22 are included in the Appendix hereto which forms part of this specification. The programs are formatted into the modules described above with respect to the active tasks and monitors associated with the trim, roll, pitch and yaw functions described. The programs are in assembly language code for the Z-8002 microprocessor as discussed above. Although the preferred embodiment of the invention was described in terms of separate processors 21 and 22 it will be appreciated that a single processor may be utilized with the tasks and monitors resident therein in practicing the invention.

The disparate functionality and disjoint computation paths, as discussed above, provide effective isolation of design errors with respect to both the software modules and the hardware. This isolation extends through the design process to the definition stage. The separation of functionality provides protection from failures within the processors, such that no single failure in processor hardware or software can cause both a task and its corresponding monitor to be disabled simultaneously. When a monitor module detects a failure, a servo enable signal on the conductor 31 or the conductor 39 (FIG. 1) will actuate the servo cutoffs 30 and 38. It is appreciated that two program modules which perform mutually disparate functions over disjoint computation paths and which do not access common subroutines, or input/output routines, and which cannot be driven into common interrupt loops are extremely unlikely to generate common-point malfunctions due, for example, to common software design or definition errors, processor or microcode design errors and compiler or assembler errors. The software monitors are testing both hardware and software for malfunctions and by utilizing appropriate automatic flight control system performance criteria, can detect both faults and design errors in hardware as well as in software. In the present invention, because of the disparate functionality and disjoint computation paths, it is extremely unlikely that a generic fault will effect a task and its corresponding monitor simultaneously so that the fault is not detected.

The above described embodiment of the invention was explained in terms of utilizing the processor monitor of said U.S. Pat. No. 4,115,847 to assure the repetitive performance of the software modules of the system. It is appreciated that the techniques of said U.S. Pat. No. 4,115,847 need be applied only to the monitor modules. The active task modules are highly visible and are therefore monitored through the operation of the system. The monitors, however, tend to be invisible functions until needed and therefore may be latently inoperative. The processor monitor of said U.S. Pat. No. 4,115,847 will detect an inoperative monitor module.

It is appreciated that because of the utilization of the present invention, a fully monitored, automatic flight control system channel is provided having fail passive performance. Two such channels provide fail operative performance.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An automatic flight control system for aircraft having sensor means for providing sensor signals in accordance with flight conditions experienced by said aircraft and having aircraft control means responsive to aircraft control command signals for controlling said flight conditions of said aircraft and for providing flight condition control signals to control aircraft functions affecting said flight conditions, one channel of said automatic control system comprising:

digital computer means having computer input means responsive to said sensor signals and said flight condition control signals, program memory means, and computer output means;

computer input coupling means for coupling said sensor signals and said flight condition control signals to said computer input means;

computer output coupling means for coupling said computer output means to said aircraft control means for providing aircraft control command signals thereto;

said digital computer means having a program stored in said program memory means comprising a plurality of first program segments for execution by said digital computer means such that said digital computer means operates responsively to said sensor signals by performing a plurality of tasks to provide said aircraft control command signals, which control said aircraft functions, to said computer output means;

said program further including a plurality of second program segments, correspondingly associated with said first program segments and responsive to said sensor signals, for respectively monitoring performance of said first program segments;

each said second program segment performing a disparate task over mutually disjoint computation paths with respect to said corresponding first program segment, said disparate tasks are arranged to test if said aircraft is performing in a manner prohibited by said aircraft functions controlled by said corresponding first program segment;
means for controlling repeated iterations of said program; and
means for assuring that all of said second program segments are executed during each iteration of said program.

2. The system of claim 1 in which said computer means comprises first and second digital computers, each having computer input means responsive to said sensor signals, program memory means and computer output means,
each said first program segment being executed by one of said first and second digital computers with the corresponding second program segment being executed by the other of said first and second digital computers.

3. The system of claim 2 in which said assuring means comprises first and second assuring means for assuring that all of said second program segments stored in the program memory means of said first and second digital computers, respectively, are executed during each said iteration of said program.

4. The system of claim 3 further including disabling means, coupled to said first and second digital computers and to said first and second assuring means for disabling said aircraft control means in response to either said first digital computer, said second digital computer, said first assuring means or said second assuring means.

5. The system of claim 1 further including disabling means coupled to said computer means and to said assuring means for disabling said aircraft control means in response to either said computer means or to said assuring means.

* * * * *